US012647070B2

(12) United States Patent
Schuknecht et al.

(10) Patent No.: US 12,647,070 B2
(45) Date of Patent: Jun. 2, 2026

(54) PHOTOVOLTAIC MODULE MOUNT WITH INTEGRATED CABLE MANAGEMENT FEATURE

(71) Applicant: ARRAY TECH, INC., Albuquerque, NM (US)

(72) Inventors: Nathan Schuknecht, Golden, CO (US); Benjamin C. de Fresart, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/311,597

(22) Filed: Aug. 27, 2025

(65) Prior Publication Data

US 2026/0081558 A1 Mar. 19, 2026

Related U.S. Application Data

(60) Provisional application No. 63/696,090, filed on Sep. 18, 2024.

(51) Int. Cl.
| | |
|---|---|
| *H02S 20/32* | (2014.01) |
| *H02S 30/10* | (2014.01) |
| *H02S 40/34* | (2014.01) |

(52) U.S. Cl.
CPC .............. *H02S 40/34* (2014.12); *H02S 20/32* (2014.12); *H02S 30/10* (2014.12)

(58) Field of Classification Search
CPC .... H02S 40/34; H02S 20/00–32; H02S 30/00; F24S 25/10; F24S 25/11; F24S 25/13; F24S 25/30; F24S 25/33; F24S 25/35; F24S 25/40; F24S 25/50; F24S 25/63; F24S 25/632; F24S 2025/802; F24S 2025/804; F24S 2025/80
See application file for complete search history.

(56) References Cited

U.S. PATENT DOCUMENTS

| | | | |
|---|---|---|---|
| 2015/0200621 A1* | 7/2015 | Reed | F24S 25/636 |
| | | | 29/525.01 |
| 2015/0349166 A1* | 12/2015 | Reynolds | H02S 40/34 |
| | | | 136/251 |
| 2022/0200522 A1 | 6/2022 | De Fresart et al. | |
| 2022/0356963 A1 | 11/2022 | Michael et al. | |
| 2023/0327603 A1 | 10/2023 | Taha et al. | |
| 2023/0361715 A1* | 11/2023 | Mouniandy | H02S 30/10 |

OTHER PUBLICATIONS

European Patent Office; International Search Report and Written Opinion issued in related PCT Application No. PCT/US2025/043713 dated Jan. 20, 2026; 8 pages.

* cited by examiner

*Primary Examiner* — Christina Chern
(74) *Attorney, Agent, or Firm* — MASCHOFF BRENNAN

(57) ABSTRACT

A photovoltaic (PV) module mount having an integrated cable management feature, a system incorporating a PV module mount, and a method for making a PV module mount are disclosed. In one embodiment, a PV module mount may include a mounting rail configured to be secured to a PV module. The mounting rail may include a first side wall having a top edge and a bottom edge, a second side wall having a top edge and a bottom edge, a connecting structure connecting the first side wall to the second side wall, and a cable management feature configured to retain one or more electrical cables. The cable management feature may be integrally formed with at least one of the first side wall, the second side wall, and the connecting structure.

16 Claims, 12 Drawing Sheets

*600*

Cutting One Or More Tabs From A Flat Sheet Of Material, Wherein At Least One Side Of The Tab Remains Connected To The Flat Sheet Of Material ⟋*602*

Cutting An Outer Shape Of A Flat Module Rail From The Flat Sheet Of Material ⟋*604*

Bending The Flat Module Rail Into A Formed Rail ⟋*606*

Bending The Tab Into A Cable Management Feature ⟋*608*

PHOTOVOLTAIC MODULE MOUNT WITH INTEGRATED CABLE MANAGEMENT FEATURE

CROSS-REFERENCE TO RELATED APPLICATION

This application claims the benefit of U.S. Patent Application Ser. No. 63/696,090, filed on Sep. 18, 2024, which is incorporated herein by reference in its entirety.

TECHNICAL FIELD

The present disclosure relates to photovoltaic module mounts that have an integrated cable management feature.

BACKGROUND

Photovoltaic (PV) module mounting systems include many components. In addition to PV modules, these systems include support structures (such as torque tubes), piles, cables that connect the PV modules and collect the generated power, and a variety of mounts, adapters, and interfaces to connect each of these components. Electrical cables are often attached to module mounts or module frames using zip ties or custom attachment clips. These cable mounting components, however, are separate from the module mounts and module frames to which they attach. Indeed, cable mounting components are often required to be installed separately from the module mounts and module frames. Installation of these cable mounting components therefore requires the performance of an additional step during the installation process.

Current cable mounting components are not ideal for a number of reasons. For example, they can be unreliable if not installed properly, they require time to install, and often incur an additional expense to the customer. Improvements can therefore be made to current cable mounting components.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Embodiments of the present disclosure address problems experienced with conventional cable management systems. Specifically, the cable management features of the present disclosure can be integrally formed with a mounting rail of a module mount that may be secured to a PV module. Manufacturing a mounting rail so that it includes a cable management feature in a relatively low stress region on the rail simplifies the installation process, reduces material required, and lowers costs.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

The module mounts of the present disclosure integrate a cable management feature into the body of the mounting rail. By integrating the cable management feature into the mounting rail itself saves money in both materials required and installation time as no separate cable management components are required.

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
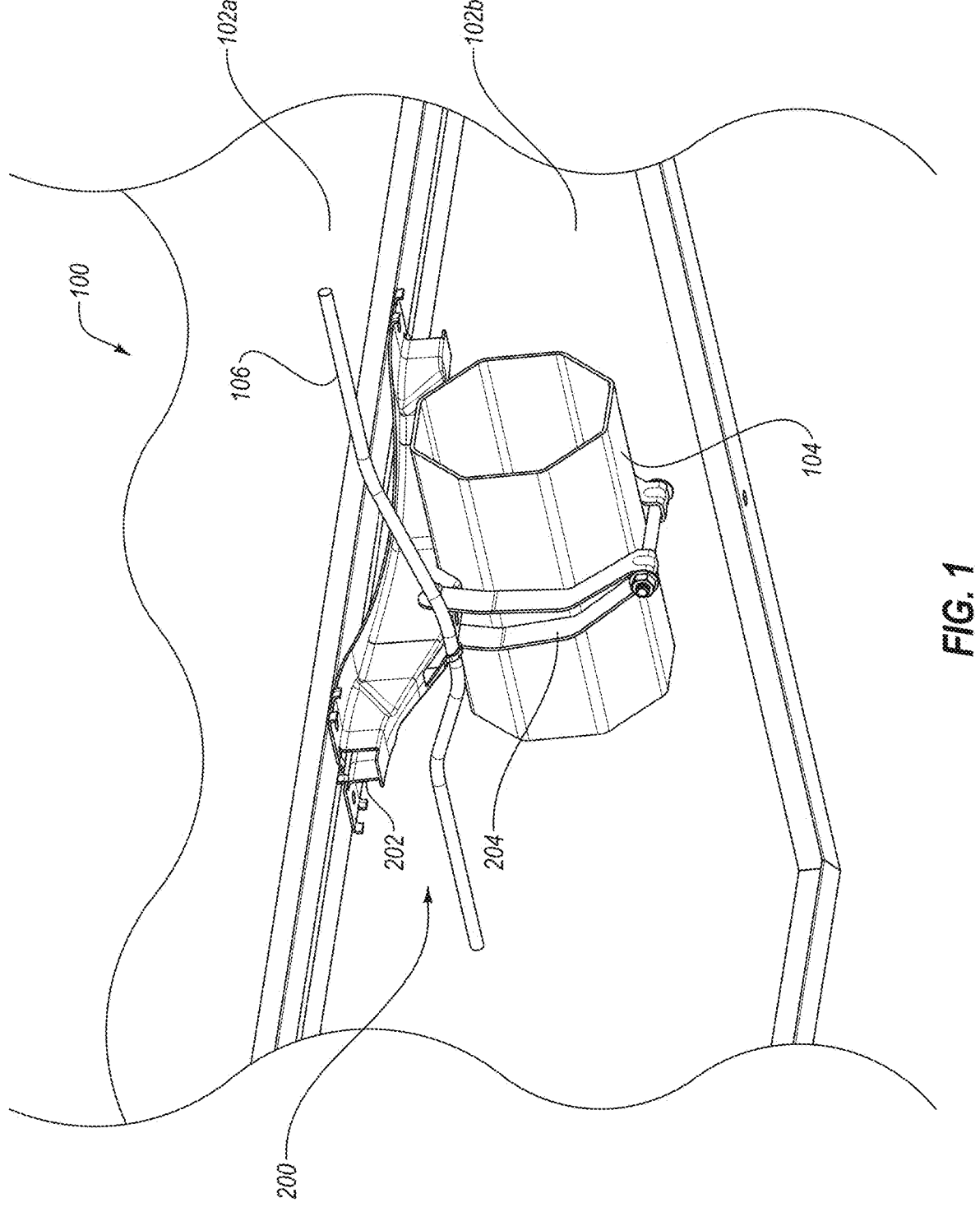
FIG. 1 illustrates a first example system for mounting photovoltaic (PV) modules using a module mount that includes an integrated cable management feature.

FIG. 1 illustrates a first example system 100 for mounting PV modules. The system 100 includes PV modules 102a and 102b, a support structure 104, an electrical cable 106, and a module mount 200 that includes a mounting rail 202 and a mounting mechanism 204. The mounting rail 202 is secured to the PV modules 102a and 102b. As provided in more detail hereafter, the mounting rail 202 includes an integrated cable management feature that holds the electrical cable 106. The electrical cable 106 may be electrically connected to the PV modules 102a and 102b or other components of the system 100. The support structure 104 is a torque tube and the mounting mechanism (which in this embodiment is a clamp) 204 is secured to the torque tube. In some embodiments, the support structure 104 may extend for long distances in both directions and there may be any number of PV modules secured to the support structure 104 through a plurality of module mounts 200.

While the system 100 only includes a single electrical cable, any number of cables may be secured to the module mount 200. In some embodiments, the module mount 200 may include a second integrated cable management feature on an opposite side of the support structure 104 to which additional electrical cables may be secured.

Figure 2A:
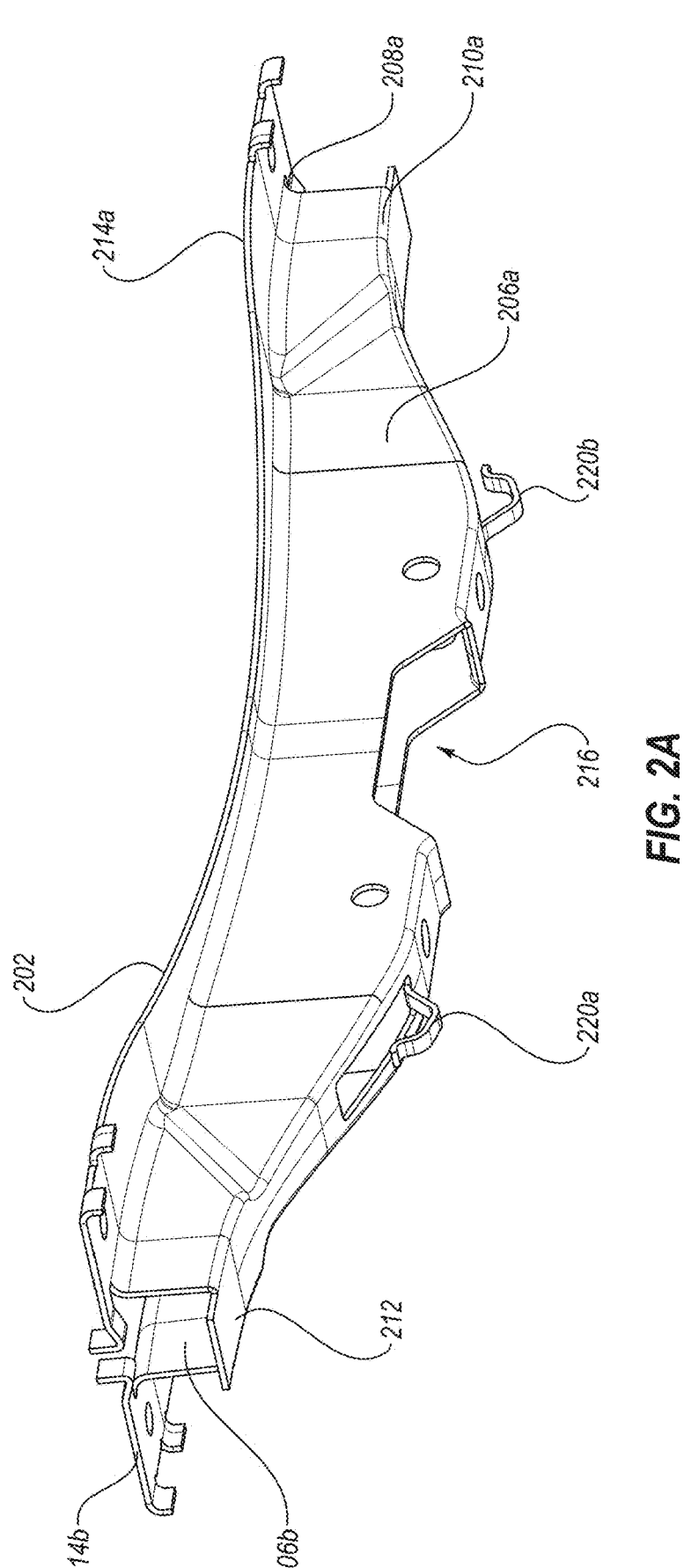
FIGS. 2A-2D illustrate various views of the mounting rail shown in FIG. 1.
Figure 2B:
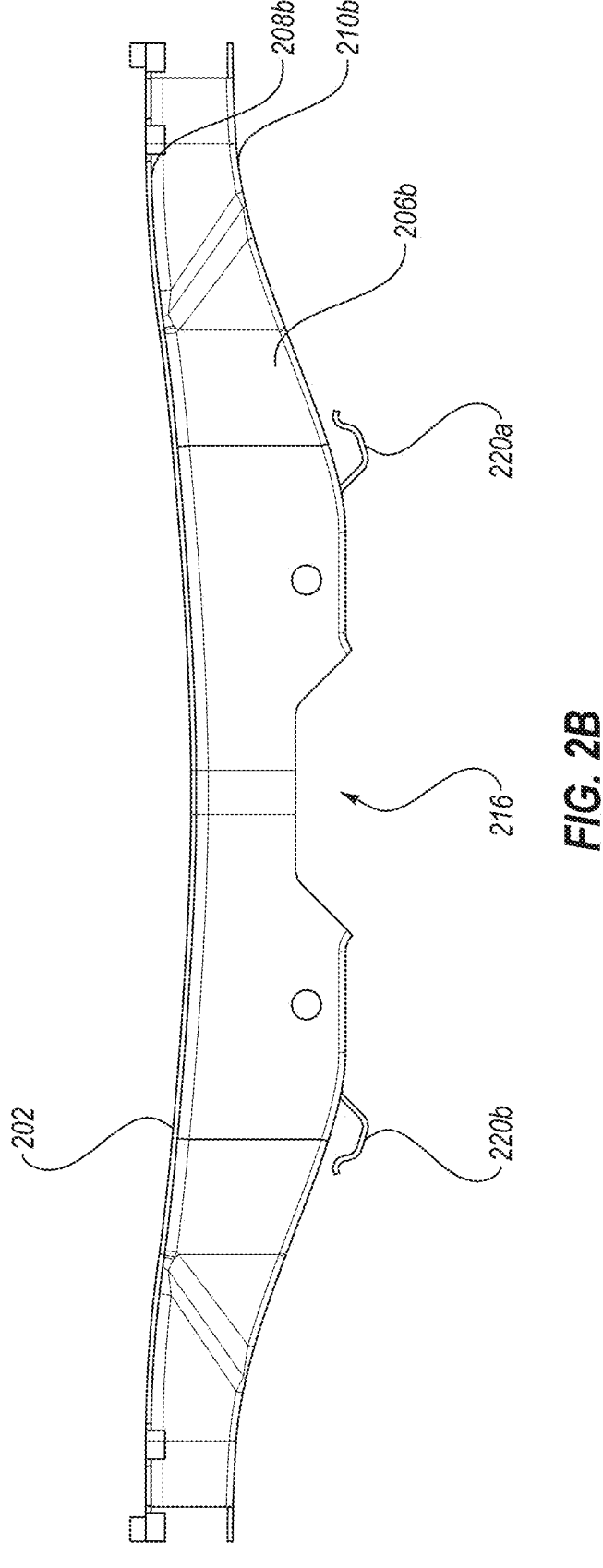
Figure 2C:
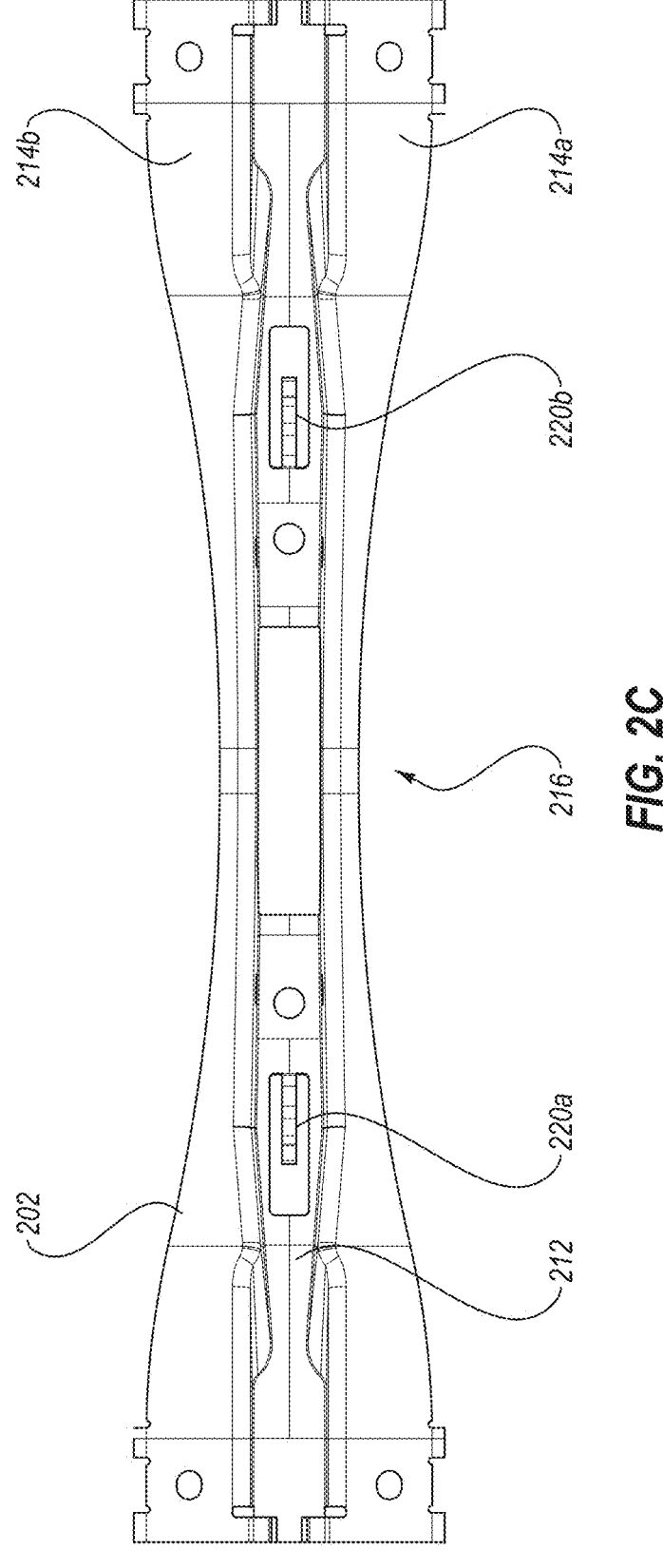
Figure 2D:
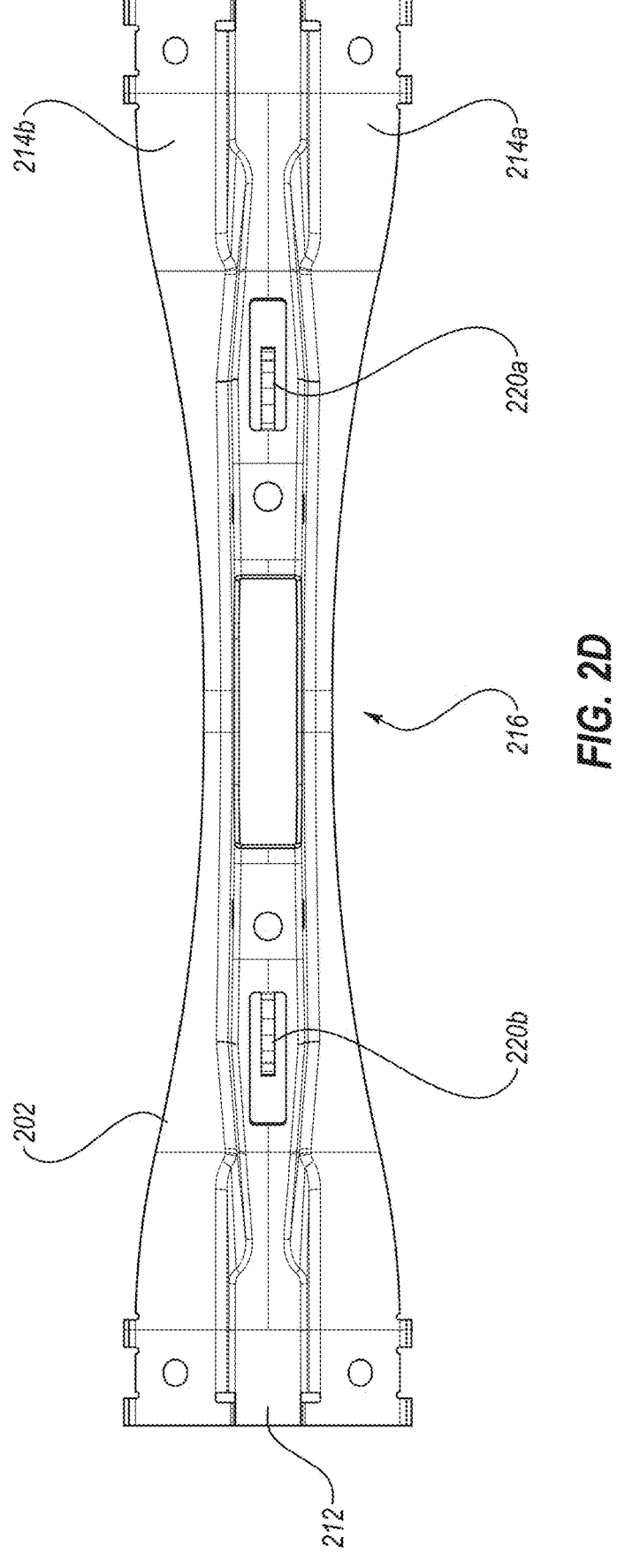

FIGS. 2A-2D illustrate various views of the mounting rail 202 shown in FIG. 1. FIG. 2A illustrates a perspective view of the mounting rail 202. FIG. 2B illustrates a side view of the mounting rail 202. FIG. 2C illustrates a top down view of the mounting rail 202. FIG. 2D illustrates a bottom up view of the mounting rail 202.

The mounting rail 202 includes a first side wall 206a and a second side wall 206b. The first and second side walls 206a and 206b include top edges 208a and 208b, respectively. The first and second side walls 206a and 206b include bottom edges 210a and 210b, respectively. The mounting rail 202 also includes a connecting structure 212. The connecting structure 212 connects the bottom edges 210a and 210b of the first and second side walls 206a and 206b to create an elongated structure.

The connecting structure 212, along with the first and second side walls 206a and 206b, define a hole 216 that is sized and shaped to receive a portion of a support structure, such as a torque tube. For example, the hole defined by the mounting rail 202 is sized and shaped to receive a polygonal shape such as a hexagon or an octagon.

The mounting rail 202 also includes a first mounting shelf 214a that is connected to the top edge 208a of the first side wall 206a. The first mounting shelf 214a may be configured to be coupled to and support a PV module. The mounting rail 202 also includes a second mounting shelf 214b that is connected to the top edge 208b of the second side wall 206b. The second mounting shelf 214b may also be configured to be coupled to and support a PV module.

The mounting rail 202 further includes a first cable management feature 220a and a second cable management feature 220b. The first and second cable management features 220a and 220b are configured to retain one or more electrical cables, which may be electrically connected to PV modules or other components of the PV system. The first and second cable management features 220a and 220b comprise tabs that are cut from material that is part of the connecting structure 212. In other words, three sides of the first and second cable management features 220a and 220b are cut into the connecting structure 212. The tabs formed are then bent into a shape that allows the first and second cable management features 220a and 220b to retain the electrical cables. The uncut fourth sides of the first and second cable management features 220a and 220b remain connected to the connecting structure 212. In some embodiments, the bent tabs may extend below the level of the connecting structure 212.

The first and second cable management features 220a and 220b are not independent components that are separately secured to the mounting rail 202. Rather, the first and second cable management features 220a and 220b are integrally formed with, or made from the same material as, the connecting structure 212. In some embodiments, the entire mounting rail 202 may be integrally formed. In other words, the first and second side walls 206a and 206b, the connecting structure 212 including the first and second cable management features 220a and 220b, and the first and second mounting shelves 214a and 214b may be made from the same piece of material. These different elements may be created by cutting tabs and/or bending the material into the desired shape. In some embodiments, the material may be a single sheet of metal.

The location of the first and second cable management features 220a and 220b may include areas that experience low stress in comparison to other areas of the mounting rail 202 such that the cable management features 220a and 220b do not compromise the integrity of the mounting rail 202. In some embodiments, the side walls of a mounting rail may bear more stress than a connecting structure, making material from the connecting structure most suitable for a cable management feature. However, areas other than a connecting structure may be used to form cable management features. In some embodiments, the material cut from the connecting structure 212 or the first and second side walls 206a and 206b to define the hole 216 may be used to create a cable management feature. For example, all or a portion of the material that is cut from the connecting structure 212 could remain attached on one side and bent around to retain one or more electrical cables. In other embodiments still, tabs could be cut out of one or both of the side walls or mounting shelves to create a cable management feature. Further still, a cable management feature may be an extension of material of the mounting rail. For example, instead of cutting a cable management feature from portion of a mounting rail, the mounting rail may include an extension of material, for example from a wall or a connecting structure, that is bent back to create a cable management feature.

While the cable management features 220a and 220b are substantially rectangular with three sides cut from the connecting structure 212 and one side remaining attached to the connecting structure 212, any shape or configuration of cable management feature is possible. In some embodiments, the cable management feature may have a circular, oval, or other polygonal shape. One or more sides of a cable management feature having any shape may be cut from a mounting rail and bent to form the cable management feature. In some embodiments, one or more sides or portions may remain attached to the connecting structure.

Figure 3:
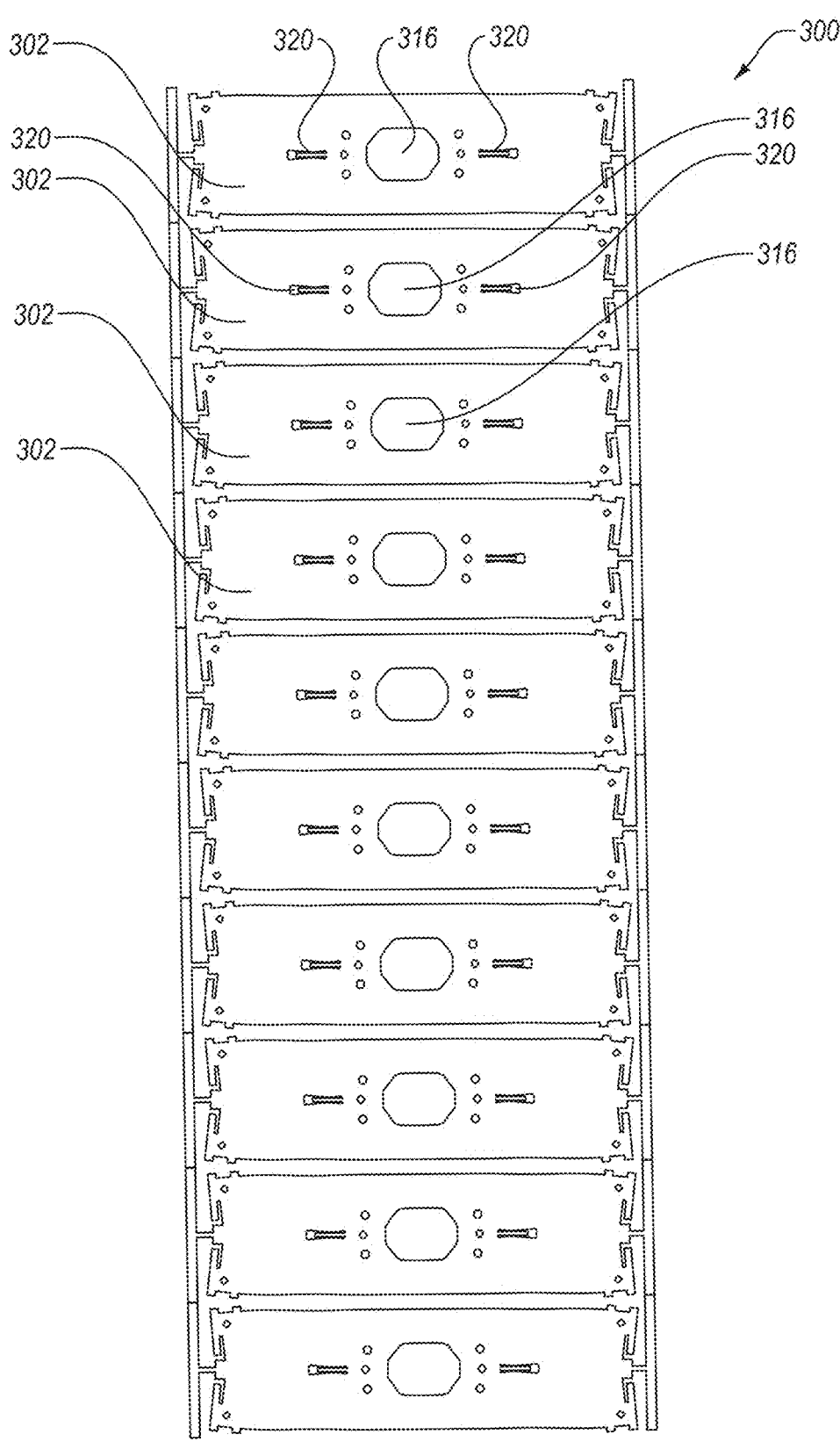
FIG. 3 illustrates a flat metal sheet with a number of module mounts that include an integrated cable management feature.

FIG. 3 illustrates a flat metal sheet 300 with a number of partially cut mounting rails 302. While the module mounts 302 have not been bent to form the shapes of the walls, connecting structure, and mounting shelves, torque tube holes 316 as well as tabs 320 for creating the cable management features have been cut. To complete production, the mounting rails 302 may be completely cut from the sheet and then bent into the shape shown in FIGS. 2A-2D. As can be seen from FIG. 3, a number of module mounts 302 may be created from a single sheet of flat metal.

Figure 4:
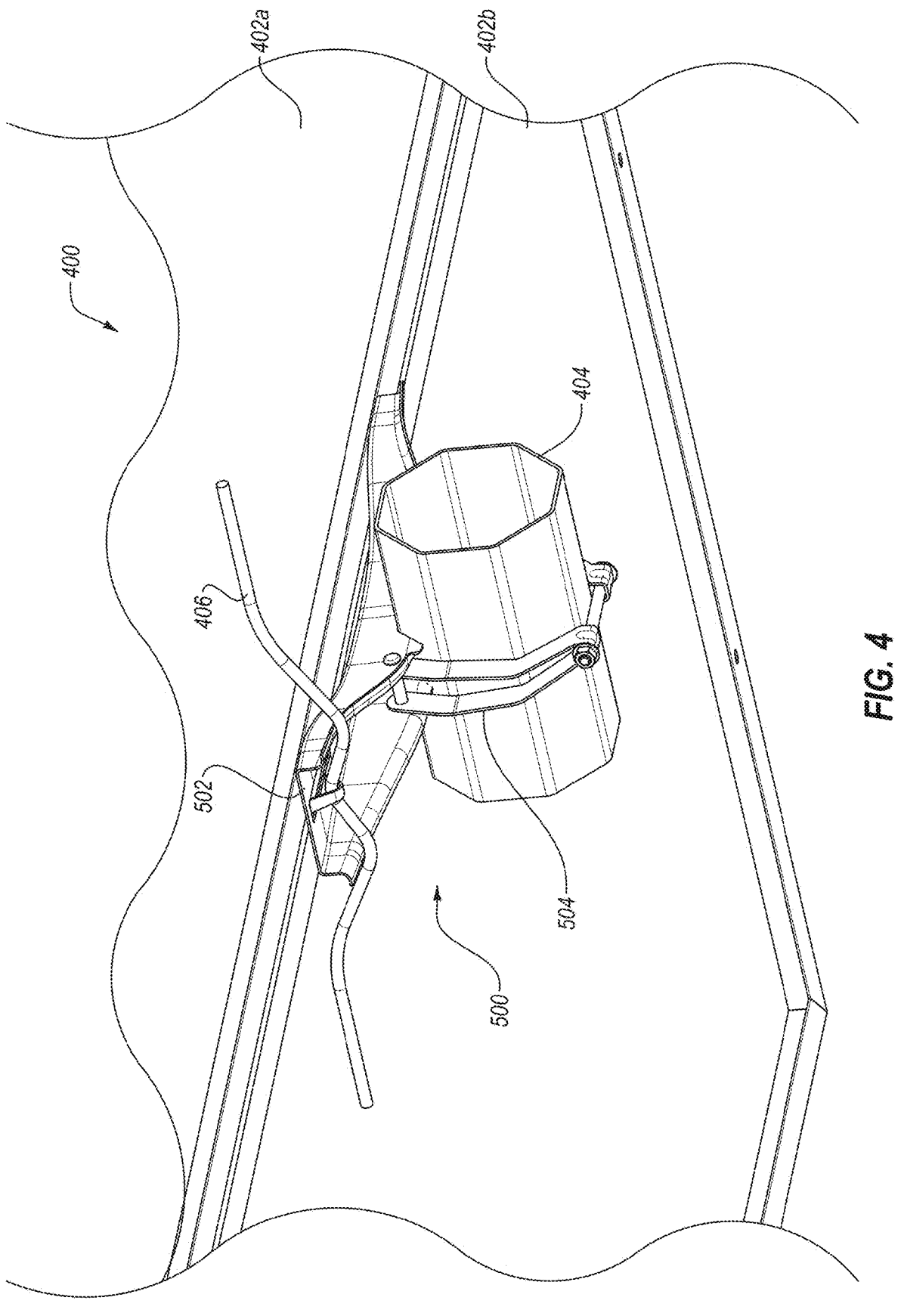
FIG. 4 illustrates another example system for mounting PV modules using a module mount that includes an integrated cable management feature.

FIG. 4 illustrates another example system 400 for mounting PV modules. The system 400 includes PV modules 402a and 402b, a support structure 404, an electrical cable 406, and a module mount 500 that includes a mounting rail 502 and a clamp 504. The mounting rail 502 is secured to the PV modules 402a and 402b. As provided in more detail hereafter, the mounting rail 502 includes an integrated cable management feature that holds the electrical cable 406. The electrical cable 406 may be in electrically connected to the PV modules 102a and 102b or other components of the PV system of which the system 400 is a part. The support structure 404 is a torque tube and the clamp 504 is secured to the torque tube. In some embodiments, the support structure 404 may extend for long distances in both directions and there may be any number of PV modules secured to the support structure 404 through a plurality of module mounts 500.

While the system 400 only includes a single electrical cable, any number of cables may be secured to the module mount 500. In some embodiments, the module mount 500 may include a second integrated cable management feature on an opposite side of the support structure 404 to which additional electrical cables may be secured.

Figure 5A:
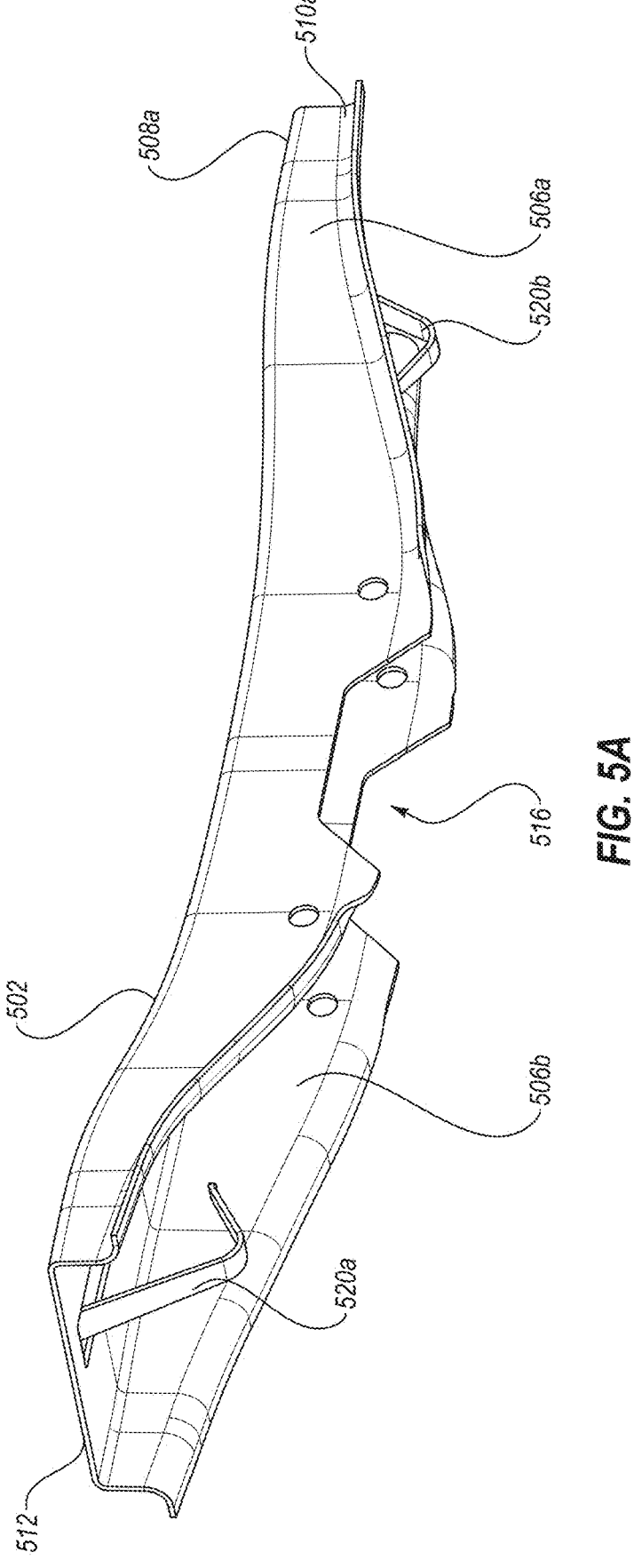
FIGS. 5A-5D illustrate various views of the module mount shown in FIG. 4.
Figure 5B:
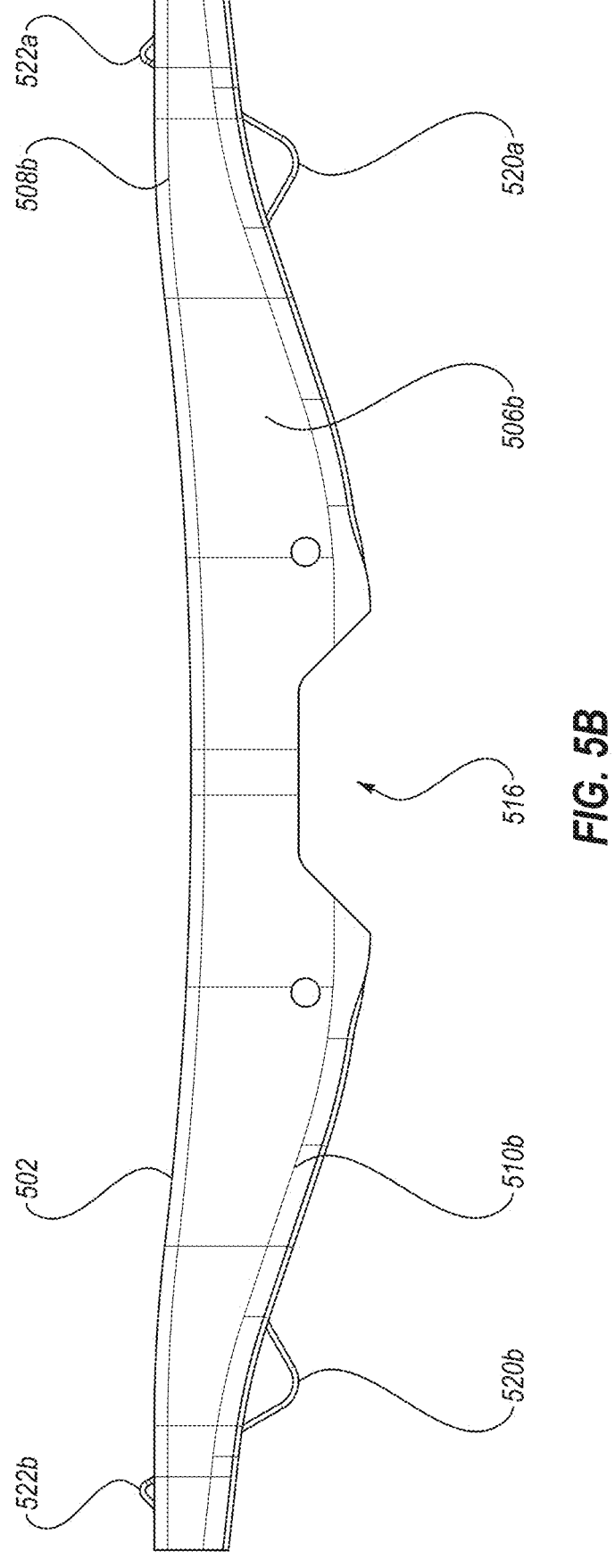
Figure 5C:
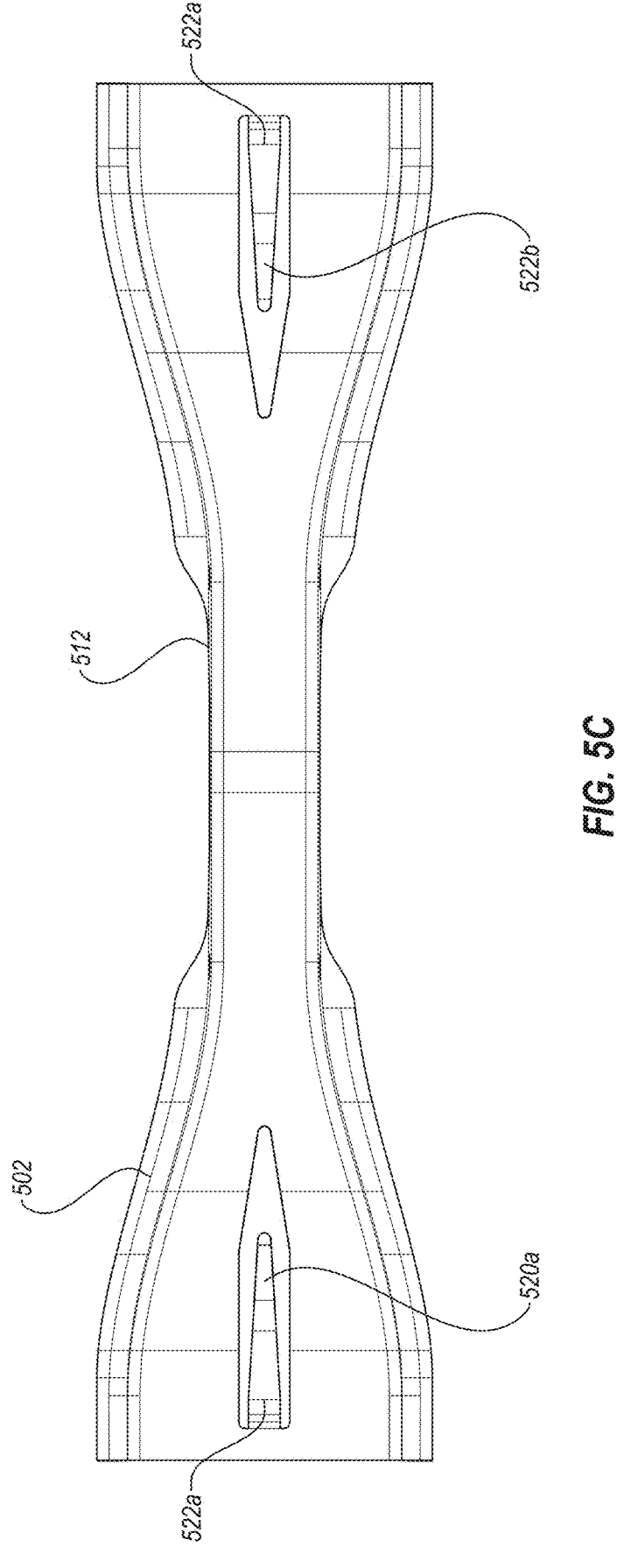
Figure 5D:
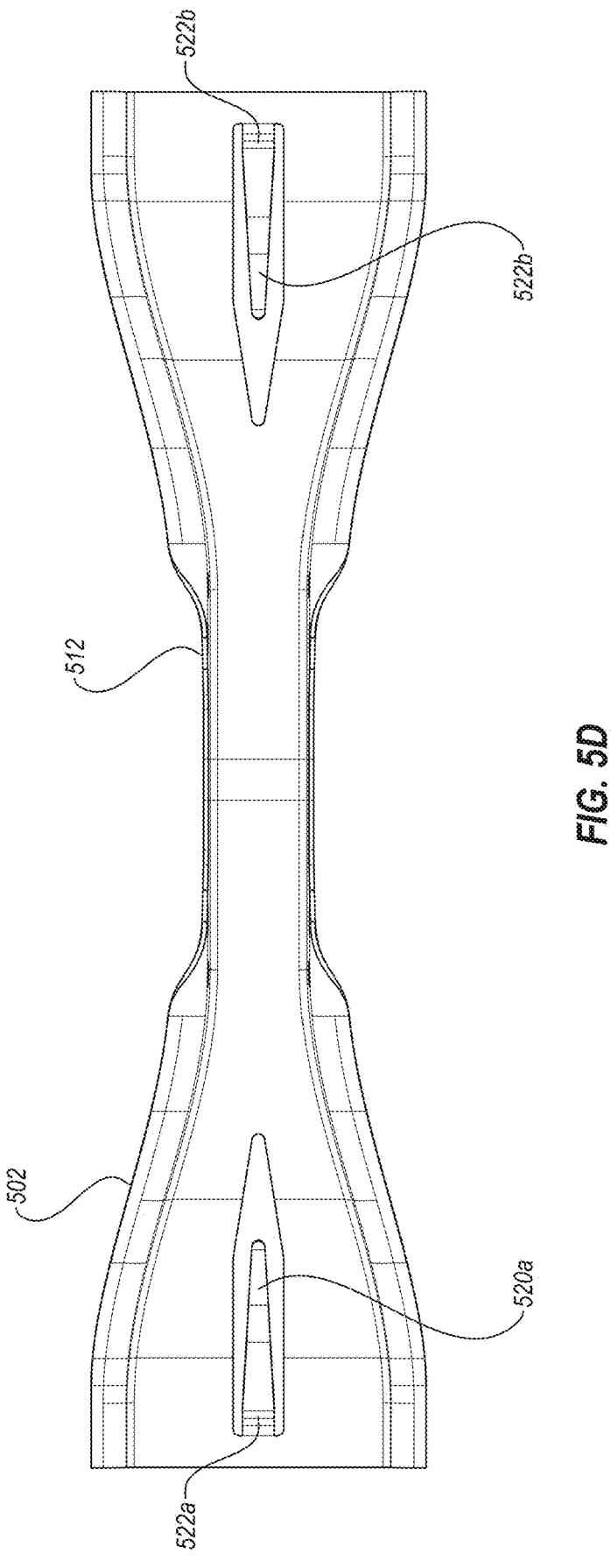

FIGS. 5A-5D illustrate various views of the mounting rail 502 shown in FIG. 4. FIG. 5A illustrates a perspective view of the mounting rail 502. FIG. 5B illustrates a side view of the mounting rail 502. FIG. 5C illustrates a top down view of the mounting rail 502. FIG. 5D illustrates a bottom up view of the mounting rail 502.

The mounting rail 502 includes a first side wall 506a and a second side wall 506b. The first and second side walls 506a and 506b include top edges 508a and 508b, respectively. The first and second side walls 506a and 506b include bottom edges 510a and 510b, respectively. The mounting rail 502 also includes a connecting structure 512. The connecting structure 512 connects the top edges 508a and 508b of the first and second side walls 506a and 506b to create an elongated structure.

All or a portion of the connecting structure 512 may be configured to be coupled to and support a PV module. For example, opposite ends of the connecting structure 512 may be attached to one or more PV modules. In some embodiments, one or more module spacers 522a and 522b may extend upward from the connecting structure 512. The module spacers 522a and 522b may provide guides to properly align PV modules on the connecting structure 512 and ensure there is a consistent amount of space between PV modules.

The first and second side walls 506a and 506b define a recess 516 that is sized and shaped to receive a portion of a support structure, such as a torque tube. For example, the recess defined by the mounting rail 502 is sized and shaped to receive a polygonal shape such as a hexagon or an octagon.

The mounting rail 502 further includes a first cable management feature 520a and a second cable management feature 520b. The first and second cable management features 520a and 520b are configured to retain one or more electrical cables, which may be electrically connected to PV modules or other components of the PV system. The first and second cable management features 520a and 520b comprise tabs that are cut from material that is part of the connecting structure 512. In other words, three sides of the first and second cable management features 520a and 520b are cut into the connecting structure 512. The tabs formed are then bent into a shape that allows the first and second cable management features 520a and 520b to retain the electrical cables. The uncut fourth sides of the first and second cable management features 520a and 520b remain connected to the connecting structure 512. In some embodiments, the bent tabs may extend below the bottom edges 510a and 510b of the first and second side walls 506a and 506b.

The first and second cable management features 520a and 520b are not independent components that are separately secured to the mounting rail 502. Rather, the first and second cable management features 520a and 520b are integrally formed with, or made from the same material as, the connecting structure 512. In addition, the cable management features 520a and 520b may be integrally formed with the module spacers 522a and 522b. In other words, the tabs cut from the mounting rail 502 may be bent to form both the module spacers 522a and 522b, which extend upward from the connecting structure 512, and the cable management features 520a and 520b, which extend downward from the connecting structure 512.

In some embodiments, the entire mounting rail 502 may be integrally formed. In other words, the first and second side walls 506a and 506b, the connecting structure 512 including the cable management features 520a and 520b and the module spacers 522a and 522b may be made from the same piece of material. These different elements may be created by cutting tabs and/or bending the material into the desired shape. In some embodiments, the material may be a single sheet of metal.

The cable management features of the present disclosure may have any shape or size. They need not be rectangular section as shown herein. Further, the location of a cable management feature on a mounting rail may vary. In some embodiments, a cable management feature may be cut from on an extension of a wall, or another component of the mounting rail. For example, one or both side walls of a mounting rail may extend downward and form a hook or looping feature that is configured to retain electrical cables. In some embodiments, the cable management feature may be configured so that a flat, non-machined surface is configured to make contact with the electrical cable. In other words, a cable management feature may be configured so that a cut or machined edge is not the surface on which an electrical cable rests. These cut or machined edges may be sharp and rough and could cause damage over time to the electrical cables they hold.

To further ensure that a cable management feature does not cause damage to any electrical cables, a coating or surface covering may be place on all or a portion of the cable management feature that is configured to make contact with a cable. For example, a silicon adhesive or plastic cover may be placed on the cable management feature to reduce the risk of damage to a cable.

While the illustrated implementations of the cable management features of the present disclosure are limited to the mounting rails shown, cable management features of the present disclosure may be implemented in any type of mounting rail configuration used in photovoltaic systems. For example, in some embodiments, a cable management feature may be incorporated into a rail that does not directly interface with a torque tube. In these embodiments, a separate torque tube attachment mechanism may be used to attach the mounting rail to the rail. In other embodiments, a rail may not be configured to be coupled to a torque tube at all. In these embodiments, the rail may mount to another type of support structure, such as a frame.

Figure 6:
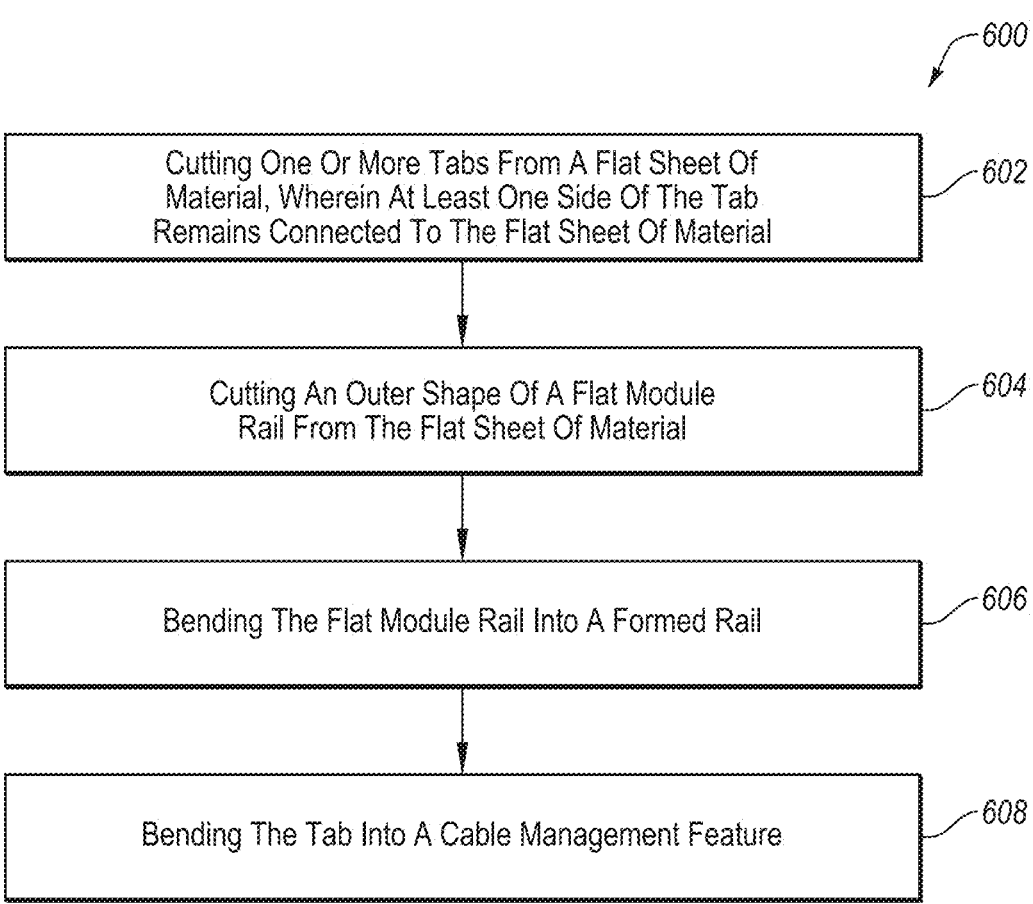
FIG. 6 illustrates steps of a method of forming a mounting rail that includes an integrated cable management feature.

FIG. 6 is a flowchart that includes steps of a method 600 of forming a mounting rail having an integrated cable management feature. The method 600 may include, at step 602, cutting one or more tabs from a flat sheet of material, wherein at least one side of the tab remains connected to the flat sheet of material. The tab can have any shape including round, oval, rectangular, or some other polygon. The shape may be an irregular polygon that includes, for example, rounded corner. Regardless of the shape, the tab is cut such that at least one side remains attached to the flat sheet of material.

The method 600 may include, at step 604, cutting an outer shape of a flat module rail from the flat sheet of material. The flat module rail may have any shape or size. Once the module rail is cut from the flat sheet, it may be bent into a module rail at step 606. This bending step may include forming sides of the module rail and a connecting member that connects the sides of the module rail. The outer shape of the module rail may include the tab that was cut into the flat sheet. However, in other embodiments, the outer shape of the flat module rail may be cut from the flat sheet of material before the tab is cut into the material such that step 604 may be performed prior to step 602. Regardless of the order, an outer shape of a flat module rail may be cut from a flat piece of material and a tab that is within the module rail may also be cut into the material.

The method 600 may include, at step 608, bending the tab into a cable management feature. For example, the tab may be bent to have a curve that leaves an opening between an end of the tab and the module rail to facilitate insertion of cables into the cable management system. The size of the tab and the form into which it is bent may be dependent on the number and size of cables that it is intended to retain.

Although the actions of the method 600 are illustrated in FIG. 6 as discrete actions, various actions may be divided into additional actions, combined into fewer actions, reordered, expanded, or eliminated, depending on the desired implementation. For example, in some embodiments, an additional step of identifying the areas of least stress in a module rail may be performed prior to cutting the one or more tabs from the flat sheet of material. Once the areas of least stress are identified, tabs may be cut from portions of the flat sheet that will form these areas of the module rail. This ensures that the tabs will not compromise the integrity of the module rail by cutting portions of material our of an area that experiences a high level of stress.

What is claimed is:

1. A photovoltaic (PV) module mount comprising:
a mounting rail configured to be secured to a PV module, the mounting rail including:
a first side wall having a top edge and a bottom edge,
a second side wall having a top edge and a bottom edge,
a connecting structure connecting the first side wall to the second side wall, and
a cable management feature configured to retain one or more electrical cables, wherein the cable management feature is integrally formed with at least one of the first side wall, the second side wall, or the connecting structure, the cable management feature being formed by material cut from the mounting rail, the material being cut from the mounting rail to define a cutout that is sized and shaped to receive a portion of a support structure; and
an attachment mechanism configured to secure the mounting rail to the support structure.

2. The PV module mount of claim 1, wherein the first side wall, the second side wall, the connecting structure, and the cable management feature are all integrally formed from a single sheet of metal.

3. The PV module mount of claim 1, wherein the cable management feature is cut from a portion of the first side wall, the second side wall, or the connecting structure.

4. The PV module mount of claim 1, wherein the connecting structure connects at least a portion of the bottom edge of the first side wall with at least a portion of the bottom edge of the second side wall.

5. The PV module mount of claim 1, wherein the connecting structure connects at least a portion of the top edge of the first side wall with at least a portion of the top edge of the second side wall.

6. The PV module mount of claim 1, wherein the support structure is a torque tube.

7. The PV module mount of claim 1, wherein the attachment mechanism is a clamp.

8. A system comprising:
a photovoltaic (PV) module;
a support structure; and
a PV module mount that secures the PV module to the support structure, the PV module mount including:
a mounting rail secured to the PV module, the mounting rail including:
a first side wall having a top edge and a bottom edge,
a second side wall having a top edge and a bottom edge,
a connecting structure connecting the first side wall to the second side wall, and
a cable management feature configured to retain one or more electrical cables, wherein the cable management feature is integrally formed with at least one of the first side wall, the second side wall, or the connecting structure, the cable management feature being formed by material cut from the mounting rail, the material being cut from the mounting rail to define a cutout that is sized and shaped to receive a portion of the support structure; and
an attachment mechanism secured to the support structure.

9. The system of claim 8, wherein the first side wall, the second side wall, the connecting structure, and the cable management feature of the mounting rail are all integrally formed from a single sheet of metal.

10. The system of claim 8, wherein the cable management feature is cut from a portion of the first side wall, the second side wall, or the connecting structure.

11. The system of claim 8, wherein the connecting structure connects at least a portion of the bottom edge of the first side wall with at least a portion of the bottom edge of the second side wall.

12. The system of claim 8, wherein the connecting structure connects at least a portion of the top edge of the first side wall with at least a portion of the top edge of the second side wall.

13. The system of claim 8, wherein the support structure is a torque tube.

14. The system of claim 13, wherein the attachment mechanism is a clamp.

15. The system of claim 8, wherein the support structure is polygonally shaped.

16. The PV module mount of claim 1, wherein the support structure is polygonally shaped.

* * * * *